C. A. MANN.
UTENSIL LIFTER.
APPLICATION FILED AUG. 7, 1919.
1,368,953.
Patented Feb. 15, 1921.
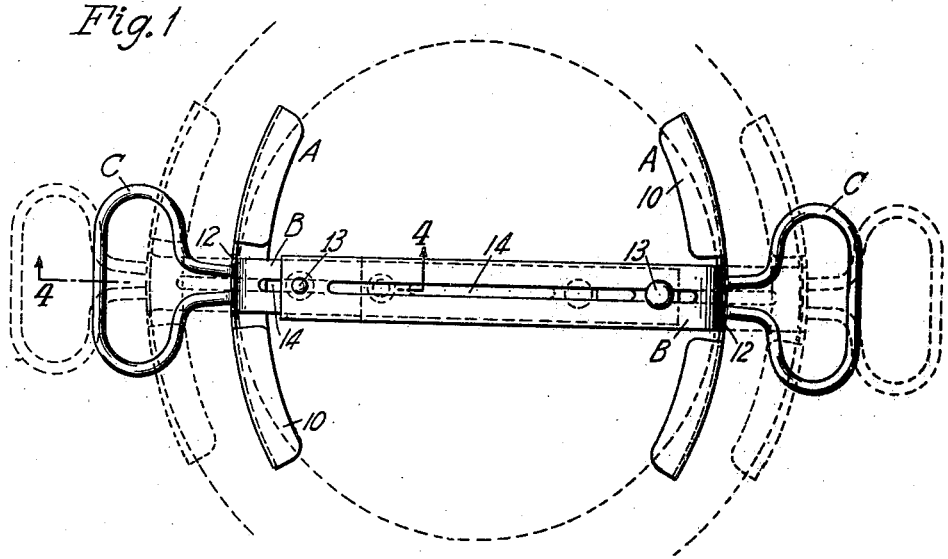
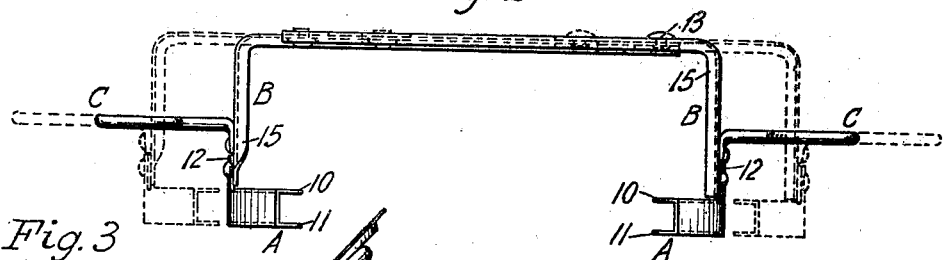
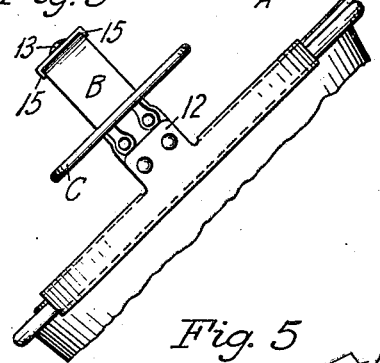
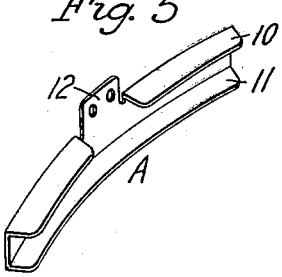
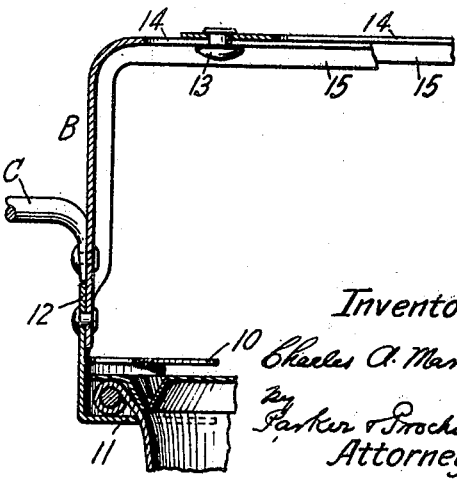
Inventor
Charles A. Mann.
By Parker & Prochnow
Attorneys

UNITED STATES PATENT OFFICE.

CHARLES A. MANN, OF BUFFALO, NEW YORK, ASSIGNOR OF ONE-HALF TO PETER T. EINHELLIG, OF BUFFALO, NEW YORK.

UTENSIL-LIFTER.

1,368,953. Specification of Letters Patent. Patented Feb. 15, 1921.

Application filed August 7, 1919. Serial No. 315,945.

*To all whom it may concern:*

Be it known that I, CHARLES A. MANN, a citizen of the United States, residing at Buffalo, in the county of Erie and State of New York, have invented a new and useful Improvement in Utensil-Lifters, of which the following is a specification.

This invention relates to devices for lifting and handling or manipulating pans and other cooking utensils or vessels and has for one of its objects to provide a practical and desirable combined utensil lifter and lid holder by means of which vessels or cooking utensils of various shapes and sizes can be readily lifted and handled or manipulated as, for instance, for holding the cover in place on the vessel while tipping the vessel to drain liquid from the other contents of the vessel. Another object of the invention is to provide a device of the character stated which is provided with opposite, relatively adjustable handled members whereby when the device is applied to a vessel or utensil, handles for lifting and holding the vessel are provided at opposite sides thereof, thus enabling a heavy or large utensil to be securely held and readily manipulated.

In the accompanying drawings:

Figure 1 is a plan view of the device, indicating by broken lines the application of the same to utensils of different sizes.

Fig. 2 is a side elevation thereof.

Fig. 3 is an end elevation showing a covered vessel held by the device in a tipped position, as for drawing liquid from the vessel.

Fig. 4 is an enlarged fragmentary section on line 4—4, Fig. 1.

Fig. 5 is a perspective view of one of the holding members detached.

The combined lifter and holder comprises two oppositely arranged, movably connected holding members which are adjustable toward and from each other to engage and release the rim of the vessel or utensil at opposite sides thereof, each of said members being provided with a handle, so that handles are provided at the opposite sides of the vessel or utensil when the device is applied thereto.

Each of the members comprises a transverse or laterally extending holding portion A provided with spaced upper and lower inwardly projecting parts or flanges 10 and 11, a shank or bar B which is rigid with the holding portion A and preferably extends upwardly therefrom and then horizontally inward, or substantially at right angles to the holding portion A, and a handle C which is rigid with the member and preferably projects outwardly from the shank or bar B at a point between the holding portion A and the horizontal extension of the shank B. The holding portion A is conveniently and preferably formed from a single piece of sheet metal bent into channel form, and has an integral upwardly projecting lug or part 12 which is riveted or otherwise rigidly secured to the lower end of the vertical portion of the shank B. This lug can be formed by slitting the upper flange of the holding portion A and bending upwardly the portion of the flange between the slits. Thus the holding portion can be formed without waste from a single rectangular strip of sheet metal. The holding portions A are preferably curved, as shown, thus adapting them to engage and securely grip the rims of circular or curved pans or vessels, and the flanges of the portions A are preferably spaced apart a distance sufficient to embrace or straddle both the outwardly projecting flange or rim of the vessel and also the overlying edge of the vessel cover, or lid, as indicated in Fig. 4, so that in the use of the device the flanged portions A hold the lid in place on the vessel when lifting and manipulating the latter.

The shanks or bars B are slidably connected so as to permit free movement of the two members of the device toward and from each other, as for instance by means of a headed rivet 13 in the end of the horizontal portion of each bar, extending through a longitudinal slot 14 in the horizontal portion of the other bar. This construction connects the two bars or shanks together and permits the bars to slide freely one on the other. The bars also are preferably formed of strips of sheet metal formed to provide side flanges 15, the shanks being of slightly different width adapting one bar to engage and slide between the flanges of the other bar or shank. The flanges 15 stiffen and strengthen the bars or shanks, improve the appearance of the device and also coöperate with the rivets 13 in guiding and holding the bars or shanks in connection.

The handles C can be formed of wire, as shown, or of any other suitable construction, and can be riveted or otherwise secured to the two members of the device.

In the use of the device the user grasps the handles C in both hands and can readily place the lifter over a vessel or utensil and move the members toward each other until the holding portions A embrace or straddle the rim of the vessel and the edge of the cover thereon, in the case of a covered vessel. The members A are held in engagement with the vessel or utensil by a slight pressure of the members toward each other and the vessel or utensil can be lifted and carried or manipulated as may be desired, the same as by means of permanent handles on the opposite sides of the vessel or utensil. The flanged holding members will hold the cover in place on the vessel and the vessel can be readily tipped to drain or pour liquid therefrom while the solid contents are retained in the vessel by the cover which is held in place by the flanged holding portions A. The device is thus very desirable for lifting and tilting vessels and holding the covers thereon while draining or pouring the liquid from the same. Since the holding portions A extend laterally a considerable distance, they have extended contacts with the vessel and prevent the device from tilting on the vessel so that the vessel can be tilted to an inclined position and firmly held by a turning motion of the handles. The device can be used as explained, on vessels or utensils of various different shapes and sizes, whether of circular or curved or rectangular form, and the location of the horizontal portions of the connecting shanks for the two members at a distance above the holding portions A adapts the device for use on vessels or utensils having covers of dome or other shape which project upwardly to different distances above the rims of the vessels.

I claim as my invention:

1. A lifter for utensils, comprising oppositely disposed holding members which are slidably connected to slide freely toward and from each other into and out of holding engagement with opposite sides of the utensil, and a handle on the utensil engaging portion of each of said members whereby the members are moved and handles are provided at opposite sides of the utensil for lifting the same.

2. A lifter for utensils having projecting rims, comprising opposite laterally extending flanged holding members which are movably connected to move into and out of holding engagement with the utensil rim at opposite sides of the utensil, and a handle on each of said members whereby the members are moved and handles are provided at opposite sides of the utensil for lifting the same.

3. A combined lifter and lid holder for utensils having projecting rims, comprising opposite laterally extending holding members which are movably connected to move into and out of holding engagement with the utensil rim at opposite sides of the utensil and have spaced upper and lower parts arranged to straddle said rim and the edge of the cover, and a handle on each of said members whereby the members are moved and handles are provided at opposite sides of the utensil for lifting the same.

4. A combined lifter and lid holder for utensils having projecting rims, comprising opposite holding members which are movably connected to move into and out of holding engagement with the utensil rim at opposite sides of the utensil and have spaced upper and lower laterally extending flanges arranged to straddle said rim and the edge of the cover, and a handle on each of said members whereby the members are moved and handles are provided at opposite sides of the utensil for lifting the same.

5. A lifter for utensils having projecting rims, comprising opposite laterally extending holding members, shanks extending upwardly and inwardly from said members, means slidably connecting said shanks whereby said holding members can be moved toward and from each other into and out of holding engagement with the utensil rim at opposite sides of the utensil, and outwardly projecting handles on said holding members.

6. A combined lifter and lid holder for utensils having projecting rims, comprising opposite laterally extending holding members provided with inwardly projecting upper and lower flanges arranged to straddle the rim and edge of the cover at opposite sides of the utensil, shanks extending inwardly from said members, means slidably connecting said shanks whereby said holding members can be moved toward and from each other into and out of holding engagement with the utensil rim and cover, and outwardly projecting handles on said holding members.

Witness my hand, this 4th day of August, 1919.

CHARLES A. MANN.

Witnesses:
C. W. PARKER,
A. L. McGEE.